(12) United States Patent
Phillips

(10) Patent No.: US 6,192,041 B1
(45) Date of Patent: Feb. 20, 2001

(54) TRANSMISSION OF DATA PACKETS OVER CDMA TYPE CELLULAR TELEPHONE

(75) Inventor: Marc Phillips, San Diego, CA (US)

(73) Assignee: Qualcomm Incorporated, San Diego, CA (US)

( * ) Notice: Under 35 U.S.C. 154(b), the term of this patent shall be extended for 0 days.

(21) Appl. No.: 09/118,570

(22) Filed: Jul. 17, 1998

Related U.S. Application Data

(60) Provisional application No. 60/075,077, filed on Feb. 18, 1998.

(51) Int. Cl.[7] ....................................................... H04Q 7/24
(52) U.S. Cl. ................................................................ 370/338
(58) Field of Search .................................... 370/310, 335, 370/328, 338, 342, 349, 441, 351–356; 455/550–557; 379/229

(56) References Cited

U.S. PATENT DOCUMENTS

| | | | |
|---|---|---|---|
| 5,949,775 | * | 9/1999 | Rautiola et al. ...................... 370/338 |
| 5,978,386 | * | 11/1999 | Hamalainen et al. ................ 370/338 |
| 6,009,088 | * | 12/1999 | Taguchi et al. ...................... 370/338 |
| 6,081,536 | * | 6/2000 | Gorsuch et al. ..................... 370/468 |
| 6,097,733 | * | 8/2000 | Basu et al. ........................... 370/468 |

\* cited by examiner

*Primary Examiner*—Ajit Patel
(74) *Attorney, Agent, or Firm*—Philip Wadsworth; Charles D. Brown

(57) ABSTRACT

A system and method for enabling the use of popular serial networking application software to transmit PPP packet data via a CDMA type subscriber device to a network such as the internet. One or more reserved phone numbers is stored in memory within the subscriber device. The networking application is provided a telephone number to be dialed in order to make a connection to the internet. The telephone number provided to the networking application is compared to the stored reserved telephone numbers. If there is a match, the subscriber device transmits a CONNECT signal back to the networking application and initiates a packet data call. If there is no match, the subscriber device initiates an asynchronous data call.

12 Claims, 3 Drawing Sheets

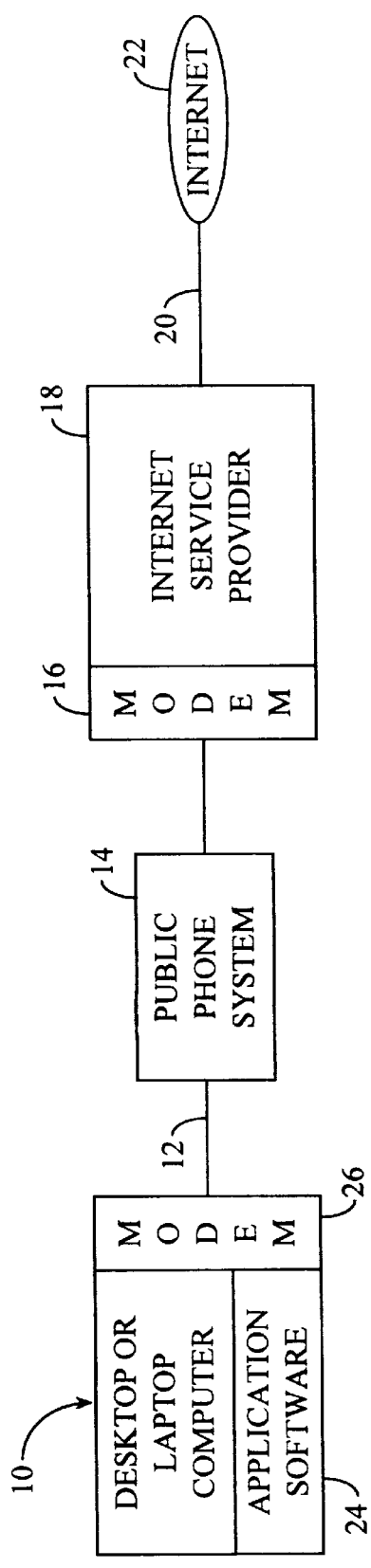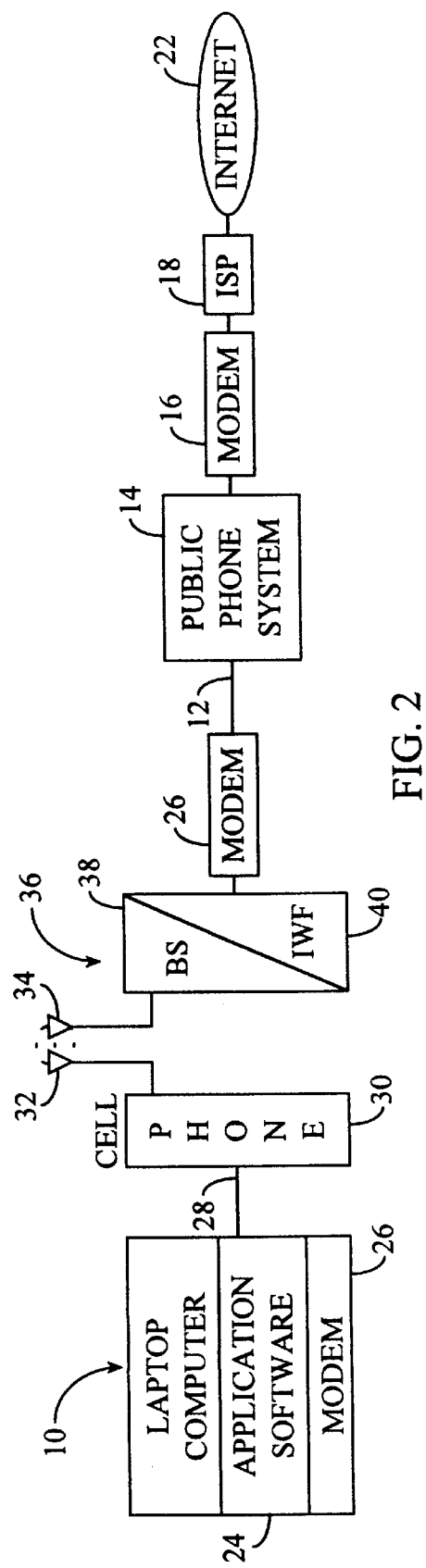
FIG. 1
FIG. 2

TRANSMISSION OF DATA PACKETS OVER CDMA TYPE CELLULAR TELEPHONE

This application claims the benefit of U.S. Provisional No. 60/675,077, Feb. 18, 1998.

FIELD OF THE INVENTION

This invention relates to the transmission of PPP data packets from networking application software running on a host computer to a network such as the internet and more particularly relates to the transmission of such data packets over a CDMA (Code Division Multiple Access) type cellular telephone.

BACKGROUND

It is considered commonplace for a user to connect his/her computer with the internet. A computer user may employ any of various popular serial networking application software packages to make such a connection, and to send out PPP (Point-to-Point Protocol) data packets to an attached device such as a modem. (The modem may also be integral to the computer). Many such popular serial networking applications will not transmit their PPP data packets until they have received a signal (called the "CONNECT" signal) indicating that the attached device has dialed a requested telephone number and completed the customary "handshake" protocol with the corresponding remote modem (i.e. the remote modem of an internet service provider). Other networking applications will transmit the PPP data packets if the user sets the command AT+CRM=1. Once the AT+CRM command is set, it is set for all networking applications hosted on that computer, and if a user wants to switch from an asynchronous mode of communication (where AT+CRM must be set to=0) to a packet data mode (where AT+CRM must be set=1) the user must reset the AT+CRM command each time he/she switches modes.

A CDMA type cellular phone does not dial a telephone number and does not perform the usual "handshake" protocol in order to set up a PPP data packet call. Therefore, the networking application software will not receive a "CONNECT" signal and will not begin transmission of the PPP data packets, unless some additional action is taken such as setting the AT+CRM command=1. There is thus a need for a simple and convenient procedure to induce a networking application, which normally requires a "CONNECT" signal, to transmit its PPP data packets when its connection to the internet is to be made via a CDMA type device such as a CDMA type cellular telephone. Such procedure should not require the user to reset the AT+CRM command each time a mode change is desired.

SUMMARY OF THE INVENTION

In order to induce the networking application software to transmit its PPP data packets, the data capable CDMA subscriber device (e.g. cell phone) monitors the telephone dial string command sent by the networking application and compares it against a (list of) reserved phone number(s). When the subscriber device detects/receives a typical "AT" dial string command the subscriber device examines the phone number contained within the dial string, and compares it against the reserved phone number(s).

If the phone number contained within the dial string is not one of the reserved numbers, the CDMA device will construct the usual asynchronous data call and transmit the call over the system. In response, the IWF (inter working function) will issue the expected "CONNECT" signal back to the networking application. Having received the expected "CONNECT" signal, the networking application will then transmit asynchronously in the normal manner.

If the phone number contained within the dial string matches a number on the reserved list, the CDMA subscriber device does not construct a CDMA call in the asynchronous format (i.e., asynchronous service options 0x0004, 0x0005, 0x1004, 0x1005, 0x12 or 0x13). Instead, it constructs a data packet call (i.e., packet service options 0x0007, 0x00015 or 0x1007) and simply transmits a return "CONNECT" signal to the networking application. This tricks the networking application into believing that the CDMA device has nearly instantaneously connected with a remote modem. The networking application then transmits its PPP packets as desired, via the CDMA subscriber device.

Other features and advantages of the invention will become readily apparent from the following detailed description of the invention and its various embodiments, from the claims and from the accompanying drawings in which the details of the invention are fully and completely disclosed as part of this specification.

DESCRIPTION OF THE DRAWINGS

FIG. 1 shows a typical system for connecting a computer to the internet using modems and the public telephone system.

FIG. 2 illustrates a system for using a CDMA cellular telephone and base station to connect a computer to the internet using a CDMA asynchronous data service.

DETAILED DESCRIPTION OF THE INVENTION

Figure 3:
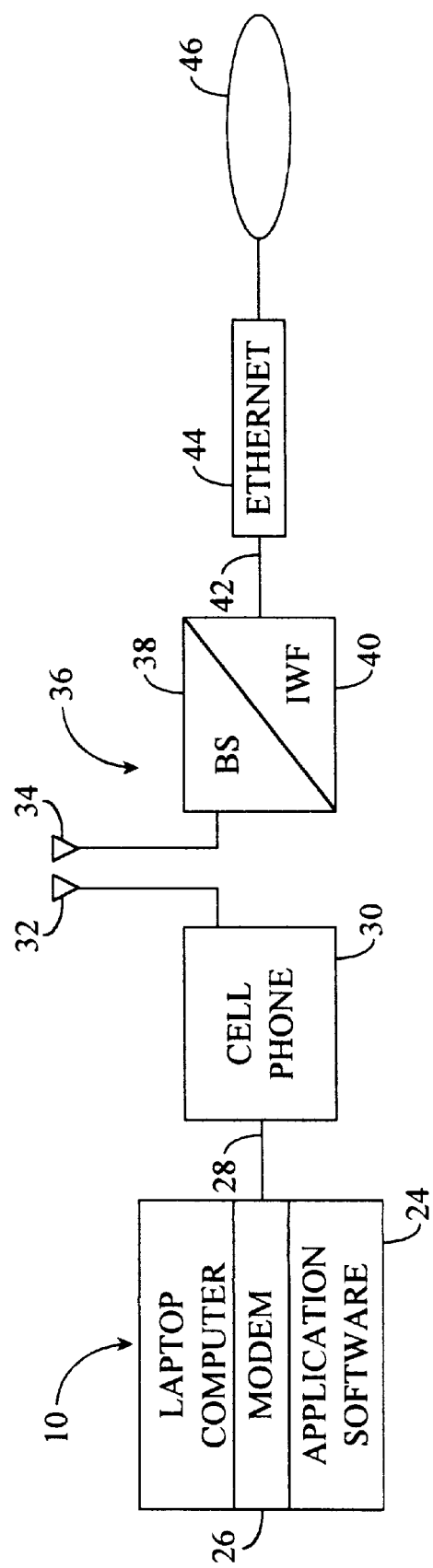
FIG. 3 is a system configured according to the present invention to use a CDMA cellular telephone and base station to connect a computer to the internet using a CDMA packet data service.

Communication between a desktop or laptop computer 10 and what has commonly come to be known as the internet 22, may readily be accomplished by means of a system such as illustrated in FIG. 1. A computer 10 is connected over a public telephone line 12 and through the public telephone system 14 to the remote modem 16 of an internet service provider 18. The internet service provider uses any acceptable communication path 20 to connect the computer 10 to the internet 22. A request to access the internet (or other "network") is usually initiated by the user of the computer through a networking application software package 24. The computer user provides the networking application software with the telephone number that is to be dialed in order to access the desired internet service provider. The user commands the networking application software 24 to access the internet. The software 24 then passes the phone number of the internet service provider's modem 16 to the modem 26 associated with the computer 10. The modem 26 may be integral with the computer or may be a separate device connected to the computer by appropriate means. The modem 26 then sends the appropriate signals, i.e. a dial string command which includes the telephone number of the destination modem 16, over a phone line 12 through the public telephone system 14 to the modem 16. The modems 26 and 16 then engage in the usual "handshake" protocol to establish the connection to the internet service provider 18. Once the protocol is completed and the connection is confirmed, modem 26 sends a CONNECT signal back to the application software 24. Only after receipt of the CONNECT signal will the networking application software 24 begin to transmit its PPP data packets through the system to the ultimate destination within the internet (or other network).

In today's fast paced world, a computer user may be "on the go" using a portable laptop computer, and may not have access to a telephone line 12. In that case, a system such as shown in FIG. 2 may be used to connect the computer 10 to the internet 22. The laptop computer is provided with a hardwire direct connection 28 to a cellular telephone 30 which is capable of CDMA asynchronous data service. Although computer 10 may have an integral modem 26, the modem is not connected to the cellular telephone. Instead, cellular telephone 30 is connected directly to a data port of computer 10 by the direct connection 28. Cellular telephone 30 uses its antenna 32 to transmit data electromagnetically via antenna 34 to an associated base station system 36 including a base station 38 and IWF 40. The base station system is connected to a modem 26' which is analogous to modem 26 of FIG. 1. Modem 26' is connected (as modem 26 was connected) to a physical telephone line 12. The remainder of the path to internet 22, as shown in FIG. 2, is the same as that shown in FIG. 1. The operation of the system shown in FIG. 2 is substantially the equivalent of the operation of the system of FIG. 1. In FIG. 2, the cellular phone 30, the base station system 36 and modem 26' serve merely to access a physical phone line 12. In other words, they function as a solid wire connection to phone line 12. Modem 26' and modem 16 engage in the customary "handshake" protocol, and when the connection is established, modem 26' sends a CONNECT signal back through the system to the networking application software 24, prompting it to commence transmission of its PPP data packets. No data packets will be sent prior to receipt of the CONNECT signal.

The system configuration shown in FIG. 2 is the typical configuration for asynchronous calls. The amount of time required for the local modem 26' to dial up the remote modem 16 can be substantial. For example, it would not be unusual for the total time consumed by the placement of the telephone call and completion of the "handshake" protocol to exceed 25 seconds. Air time on a cellular phone is expensive and the long delay is a substantial annoyance to many users.

FIG. 3 shows a communication system including a computer connected to the internet via a cellular telephone capable of CDMA packet data service. For this system to work, the networking application software must send PPP packets to the cellular phone. Some popular networking application software packages will send PPP packets only after instructing an attached modem 26 to dial a remote modem and only after having received back a notification signal (e.g. a CONNECT signal) that the remote modem and the attached modem have completed their "handshake" protocol. A CDMA telephone wishing to use the packet data service would not use a modem and hence no such notification signal would be received. However, current CDMA phone standards allow the user to initiate PPP data packet transmission by setting the command AT+CRM=1. But for many users, this is not a simple nor convenient task. This invention makes it possible to use such popular networking application software by having the cellular telephone, upon receipt of a preselected "reserved" phone number, return the CONNECT signal, thereby inducing the networking application software to send the PPP data packets. The list of reserved phone numbers may be preset by the phone manufacturer or may be set by the user. The phone number to be requested by the networking application software is also readily specified by the user through the user interface, and different phone numbers may be specified for each hosted networking application software package.

It is to be understood that while reference has been made to "phone number", "phone number" may be any desired combination of symbols and/or numbers, and hence such "phone number" will also be referred to generally as a "data entry" at various times in this specification.

Before a user can instruct the networking application software 24 of computer 10 to access the internet, the user usually must first have provided the software 24 with the proper telephone number to be dialed. This is accomplished by entering the phone number into the networking application software via its user interface. The networking application software will then dial the specified phone number when instructed by the user to access the internet. When the user instructs the networking application software to connect, the networking application software typically issues an ATD or ATDT command to the connected device (e.g. a modem or cellular telephone). The software 24 then typically waits to receive a CONNECT signal (either in result code format such as "CONNECT", "CONNECT 19200" etc., and/or the raising of the carrier detect pin). However, since the cellular phone is not a modem, and does not dial a telephone number and does not conduct any of the modem "handshake" protocol, no return CONNECT signal will be received unless the user has taken the required additional action to properly set the AT+CRM command (which is not generally convenient to do). Hence, the networking application software will not commence transmission of its PPP data packets. The present invention permits the user to easily and conveniently instruct the system to configure for a packet data call.

Figure 4:
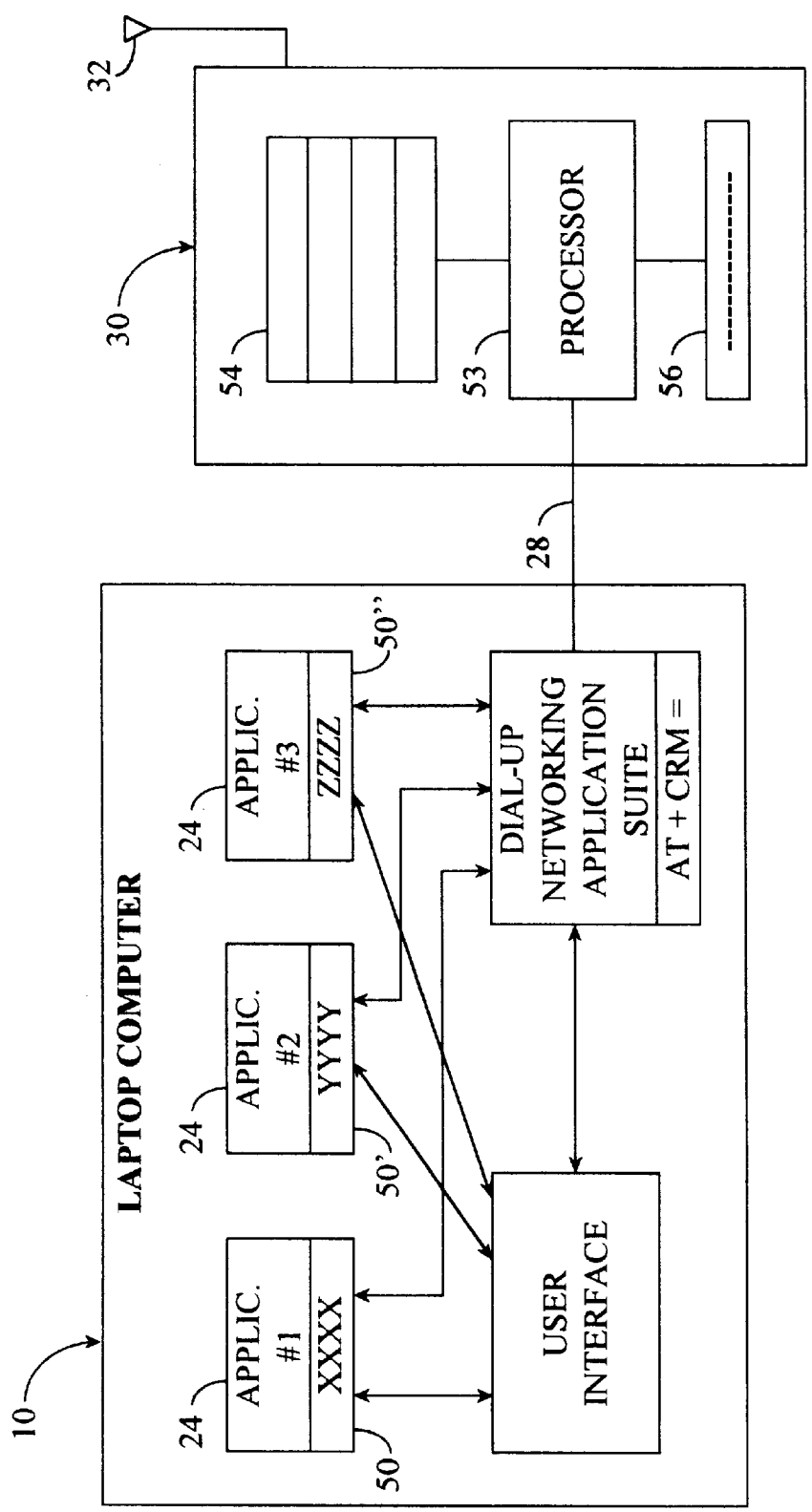
FIG. 4 is a detailed illustration of the features of the computer hosted networking software and the CDMA subscriber device (e.g., cellular telephone) configured according to the present invention.

The implementation of the present invention is best illustrated with reference to FIG. 4. The user first programs cellular phone 30 by entering one or more "reserved" phone numbers into a memory register such as a lookup table 54 within the cellular phone. Also stored in a memory register 56 within the cellular phone is the CONNECT signal. The "reserved" phone number(s) might not be an actual phone number and can be any series of numbers or symbols desired. For example, the reserved phone number might be #777 or *999. The user also provides to the networking application software a data entry which functions as the phone number that is to be dialed, by entering the data into the register 50 (or 50' or 50") specified by the respective networking application software package.

When the user instructs the networking application software 24 to connect to the internet, the software 24 retrieves the specified phone number (or data) from register 50 and constructs a dial string command which contains the specified phone number, and forwards the dial string command over direct connection 28 to the cellular phone 30. Cellular phone 30 then completes its connection with a base station system 36, extracts the phone number from the dial string command, and compares the extracted phone number with those reserved phone numbers stored in look-up table 54. If a match is detected, cellular phone 30 immediately retrieves the CONNECT signal from register 56 and transmits it back over direct connection 28 to the networking application software 24. Networking application software 24 is thus induced to believe that an almost instantaneous connection to a remote modem has been achieved and begins to transmit its PPP data packets to cellular phone 30.

If the user stores a non-reserved number in register 50 of the networking application software, the cellular phone determines that there is no match with any reserved number stored in look-up table 54 and constructs an asynchronous data call. It is then up to the system's IWF to issue a CONNECT signal to the networking application software.

There has thus been described an improved system and method for transmitting PPP data packets over CDMA type devices such as a CDMA type cellular phone. It should be understood that a person of ordinary skill in the art, upon reading the description of the invention, could devise various modifications to the invention without departing from the spirit and scope of the invention which is intended to be limited solely by the appended claims.

What is claimed is:

1. A method for operating a CDMA type subscriber device for transmission of data packets received from computer hosted networking application software to a network, comprising the steps of:
   a) providing a first data entry to said networking application software which data entry is stored as a phone number to be called for effecting access to a network;
   b) storing at least one second data entry in a memory register in said CDMA type subscriber device;
   c) comparing said first data entry to said at least one second data entry; and
   d) constructing a packet data call and providing a signal to said networking application software which indicates that said subscriber device is ready to receive data, if said first data entry matches said at least one second data entry.

2. The method of claim 1 further including the step of:
   e) constructing an asynchronous call if said first data entry is not the same as said at least one second data entry.

3. The method of claim 1 wherein said at least one second data entry comprises a plurality of data entries, stored in a memory register comprising a look-up table.

4. The method of claim 1 including the further step of:
   b)1) receiving a dial string command from said networking application, said dial string command including said first data entry.

5. The method of claim 1 wherein said signal comprises a CONNECT signal.

6. The method of claim 1 wherein said signal comprises a signal which raises a carrier connect pin.

7. A CDMA type subscriber device configured for enabling transmission of packet data from a computer to a network via serial networking application software hosted on said computer, said subscriber device comprising:
   a) a first memory register for storing at least one reserved phone number;
   b) a second memory register for storing a signal indicating that said subscriber device is ready to receive said packet data;
   c) a processor for making a comparison between said at least one reserved phone number and a number received from said networking application, and for transmitting said signal to said networking application if said comparison indicates a match; and
   said subscriber device initiating a packet data call upon detection of said match.

8. The device according to claim 7 wherein said CDMA type device comprises a CDMA capable cellular telephone.

9. The device according to claim 7 wherein said signal comprises a CONNECT signal.

10. The device according to claim 7 wherein said signal comprises a signal which raises a carrier connect pin.

11. The device according to claim 7 wherein said first memory register comprises a look-up table and said at least one reserved phone number comprises a plurality of reserved phone numbers.

12. The device according to claim 7 wherein said packet data call is initiated consistent with a packet service option selected from the group of options designated 0x0007, 0x00015 and 0x1007.

* * * * *